United States Patent [19]

Sander et al.

[11] Patent Number: 4,649,551
[45] Date of Patent: Mar. 10, 1987

[54] DECODER FOR A FREQUENCY-KEYED SIGNAL, PARTICULARLY AN FSK-VIDEO TEXT SIGNAL

[75] Inventors: Hans-Dieter Sander, Loxstedt; Wulf-Christian Streckenbach, Hemmingen, both of Fed. Rep. of Germany

[73] Assignee: Telefunken Fernseh und Rundfunk GmbH, Hanover, Fed. Rep. of Germany

[21] Appl. No.: 622,746

[22] Filed: Jun. 20, 1984

[30] Foreign Application Priority Data

Jul. 6, 1983 [DE] Fed. Rep. of Germany ....... 3324311

[51] Int. Cl.[4] .......................................... H04L 27/14
[52] U.S. Cl. ...................................... 375/81; 375/76; 375/88; 375/97; 455/260; 329/122; 331/1 A; 331/12; 331/17
[58] Field of Search ............... 375/97, 81, 88, 76; 455/208, 260; 329/122; 331/1 A, 10, 12, 1 R, 17

[56] References Cited

U.S. PATENT DOCUMENTS 4,100,503 7/1978 Lindsey et al. ...................... 331/12
4,488,120 12/1984 Carsten .............................. 329/122

FOREIGN PATENT DOCUMENTS 3022287 12/1981 Fed. Rep. of Germany .

Primary Examiner—Robert L. Griffin
Assistant Examiner—M. Haseman
Attorney, Agent, or Firm—Spencer & Frank

[57] ABSTRACT

Decoder for a frequency keyed signal, particularly an FSK videotext signal. To avoid isochronous distortions, precise matching of the decoder is necessary. Due to the provision of a additional AFC circuit (11) to regulate the natural frequency of the VCO (5) in the PLL loop (3–5) of the decoder, such matching is no longer required.

13 Claims, 5 Drawing Figures

DECODER FOR A FREQUENCY-KEYED SIGNAL, PARTICULARLY AN FSK-VIDEO TEXT SIGNAL

BACKGROUND OF THE INVENTION

For videotext (BTX) it is known to transmit a so-called FSK (frequency shift keyed) signal over the telephone network. This signal is a sinusoidal oscillation whose frequency is switched between two values corresponding to a digital signal to be transmitted. The one frequency is here 1,300 Hz and corresponds to the logic value HIGH or 1 in the digital signal. The second frequency is 2,100 Hz and corresponds to the logic value LOW or 0 in the digital signal.

Such an FSK signal is an analog signal from which a digital signal is generated in a decoder. The digital signal then serves, for example, to generate character signals in a character generator which signals, after storage of the FSK signals transmitted for a longer period of time, constitute a page of text on the screen of a television receiver.

It is known to decode the FSK signal by subjecting the signal to a PLL (phase locked loop) phase control loop whose voltage controlled oscillator (VCO) is regulated to the frequency of the respective FSK signal. For this regulation it is necessary that, if the FSK signal changes its frequency, the regulating voltage generated in the phase comparison stage of the PLL circuit and transmitted through a lowpass filter also changes. This changing voltage thus contains the information contained in the FSK signal. It is fed as signal voltage through a further lowpass filter to a circuit having a threshold value characteristic, e.g. a trigger element which generates at its output a digital signal corresponding to the frequency keying of the FSK signal. Such an FSK decoder including a PLL circuit is described in detail in the in-house publication entitled "FSK Demodulator/Tone Decoder", No. XR-2211, of EXAR INTEGRATED SYSTEMS, INC., October 1976, pages 1–6.

The values of the above-mentioned signal voltage at the input of the trigger element depend on various factors, e.g. the frequencies of the FSK signal, the natural frequency of the oscillator of the PLL circuit and the tolerances of the individual components. In practice, these parameters are subject to fluctuations so that the digital signal at the output of the above-mentioned trigger element may be falsified. A signal section of the signal which corresponds, e.g., to a signal section at a certain frequency in the FSK signal, may then be shorted, for example. This produces so-called isochronous distortions during decoding of the digital signal.

To avoid such isochronous distortions, it is necessary to precisely match the PLL decoder. This matching is necessary during manufacture of the decoder. If the stated parameters change at a later time, further matching may also be necessary during operation.

SUMMARY OF THE INVENTION

It is the object of the invention to further develop the above-described decoder so that matching is not necessary, either during manufacture or during operation and nevertheless no isochronous distortions occur.

This problem is solved by the invention as defined in claim 1. Advantageous features of the invention are defined in the dependent claims.

Thus, in the solution according to the invention, matching always takes place automatically so that one-time matching during manufacture or repeated manual matching during operation is no longer necessary. The matching according to the invention acts quasi statically and always produces optimum conditions even over long periods of time. Since matching is necessary essentially only for deviations which already exist or appear slowly, the circuit can be provided with a very high time constant. This has the advantage that the additional matching circuit is substantially secure against interference.

BRIEF DESCRIPTION OF THE DRAWINGS

One embodiment of the invention will be explained with the aid of the drawings wherein.

DETAILED DESCRIPTION OF THE PREFERRED EMBODIMENTS

Figure 1:
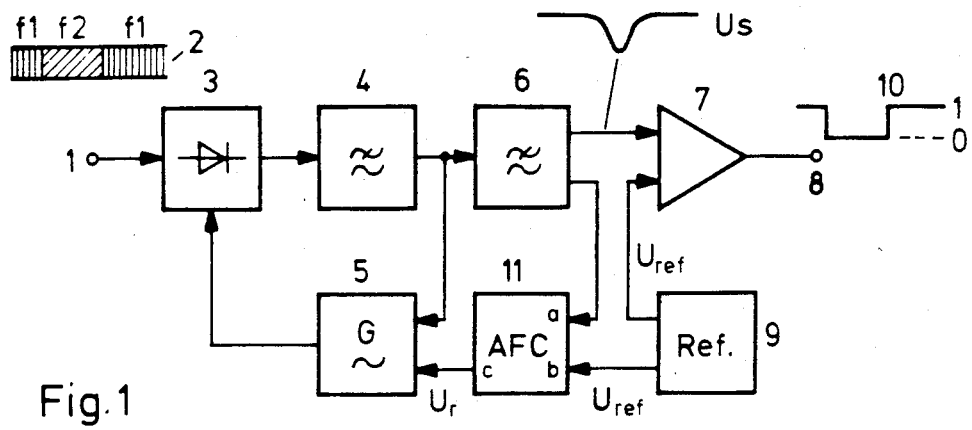
FIG. 1 is the block circuit diagram of a known decoder equipped with the circuit according to the invention.

In FIG. 1, the FSK signal 2 whose frequency is keyed between the value $f1=1,300$ Hz (logic 1) and the value $f2=2,100$ Hz (logic 0) is present at terminal 1. Signal 2 reaches the PLL circuit which includes phase comparison stage 3, lowpass filter 4 and voltage controlled oscillator 5 in the form of a VCO. The output signal of phase comparison stage 3 furnishes, via lowpass filter 4 and a further lowpass filter 6, the signal voltage Us whose value changes between two values corresponding to the frequency keying of signal 2. Signal voltage Us reaches comparison stage 7 which additionally receives a constant reference voltage Uref from voltage source 9. Comparison stage 7 is dimensioned in such a way that a digital signal 10 having the two voltage values 0 and 1 is produced at output terminal 8 corresponding to the voltage values of signal voltage Us. The circuit as described so far is known.

Additionally, an AFC circuit 11 is provided which is fed by the signal voltage Us and reference voltage Uref. Circuit 11 determines the amplitude position of signal voltage US across terminal a relative to reference voltage Uref across terminal b. If the two values of voltage Us change, thus producing a change in digital signal 10 and resulting in isochronous distortion, a regulating voltage Ur is generated at terminal c at the output of circuit 11. This regulating voltage changes the natural frequency of oscillator 5, i.e. the position of its characteristic with respect to the frequency axis, in such a manner that signal voltage Us again takes on the correct amplitude position with respect to reference voltage Uref.

Figure 2:
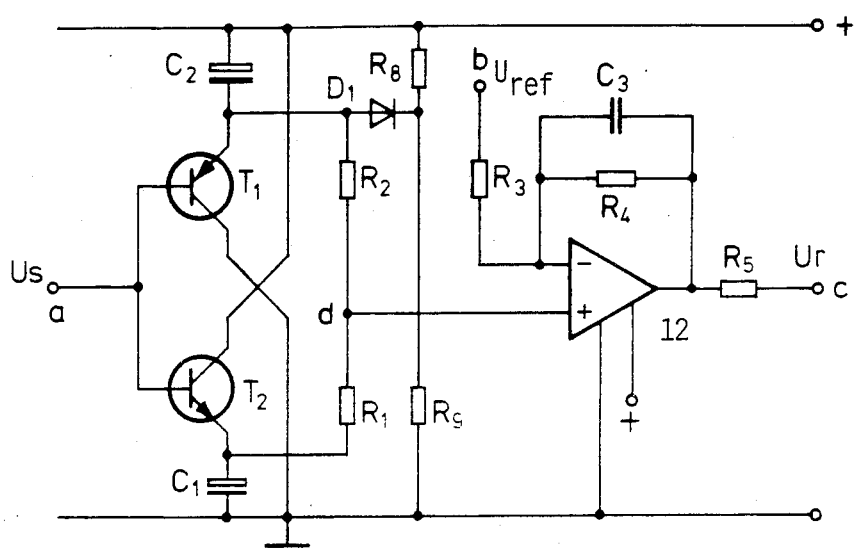
FIG. 2 is a practical embodiment of the AFC circuit of FIG. 1 with a voltage limiting diode.

FIG. 2 shows an embodiment of cirucit 11 for use in practice wherein terminals a, b, c of FIG. 2 correspond to those of FIG. 1. The positive value of signal voltage Us across terminal a is stored via transistor T2 in capacitor C1 and the negative value of signal voltage Us is stored via the complementary transistor T1 in capacitor C2. Capacitors C1, C2 are connected together by way of resistors R1, R2. The point of connection d is connected to the "+" or noninverting input of amplifier 12 to whose "−" or inverting input there is applied the reference voltage Uref from terminal b via resistor R3. The regulating voltage Ur of FIG. 1 appears at output terminal c. The RC member R4/C3 from the output to the "−" input of amplifier 12 forms a time constant of 470 ms corresponding to a limit frequency of 0.338 Hz.

Figure 3:
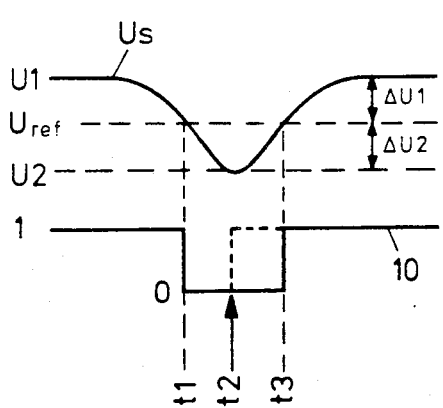
FIGS. 3 and 4 are curves explaining the effect of the matching process according to the invention.

FIG. 3 shows the correct amplitude position of signal voltage Us relative to reference voltage Uref across the inputs of comparison stage 7. Signal voltage Us changes between the values U1 and U2 whose distances ΔU1 and ΔU2 from reference voltage Uref are identical in a desired manner. Whenever signal voltage Us passes through reference voltage Uref, the value of the digital voltage 10 across terminal 8 changes. Let it be assumed that the portion of voltage 10 during t1–t3 is sampled in the middle between t1 and t3, at t2, in an evaluation circuit, e.g. a USART, connected to terminal 8. In the illustrated case, this sampling detects logic state 0.

Figure 4:
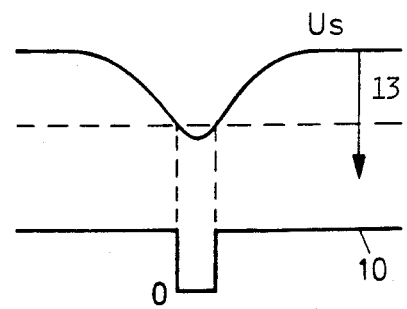

In FIG. 4, signal voltage Us is shifted in a positive direction relative to reference voltage Uref due to a change in the described parameters so that the signal component of digital voltage 10 at logic 0 is shortened. If this shortening reaches the order of magnitude of 50%, as shown in dashed lines in FIG. 3, the evaluation of signal 10 at time t2 becomes uncertain and may lead to error evaluations of digital signal 10 in the connected circuit.

In the regulating circuit according to the invention, the deviation shown in FIG. 4 causes the regulating voltage Ur to change the natural frequency of oscillator 5 in such a manner that, in FIG. 4, signal voltage Us is again shifted in the direction of arrow 13 into the position relative to reference voltage Uref shown in FIG. 3 so that the shortening of signal 10 shown in FIG. 4 no longer occurs.

In FIG. 2, the voltage across capacitor C2 is limited by diode D1 to the voltage value across the point of connection of resistors R8 and R9+0.7 V forward voltage. This voltage limitation serves the following purpose:

During asynchronous, serial data transfer, only frequency f1 = 1,300 Hz, representing the stop bit or logic state "1", respectively, is transmitted during the transmission intervals. Thus the charge of capacitor C2 is reversed since the signal level belonging to f2=2,100 Hz which charges capacitor C2 to, or holds it at a value below the reference voltage, is not present for an arbitrarily long period of time. By reversing the charge of capacitor C2, the asymmetric position of reference voltage Uref of ΔU1 and ΔU2 now initiates a regulating process until at point d there no longer is a deviation from Uref. Without diode D1 this would have the result that ΔU1 and ΔU2 each correspond to the peak value of the noise signal superposed on voltage U1. In this case the arithmetic mean of the noise signal would correspond to reference voltage Uref and would thus result in decoding of a non-existent signal. This is prevented by diode D1 in that ΔU2 is limited to a maximum voltage value which differs from Uref at least in the value of the amplitude of the noise signal toward U1 in the negative direction but, on the other hand, does not lie within the scattering range of ΔU2.

In an embodiment which was tested in practice, the components shown in FIG. 2 had the following values.

Figure 5:
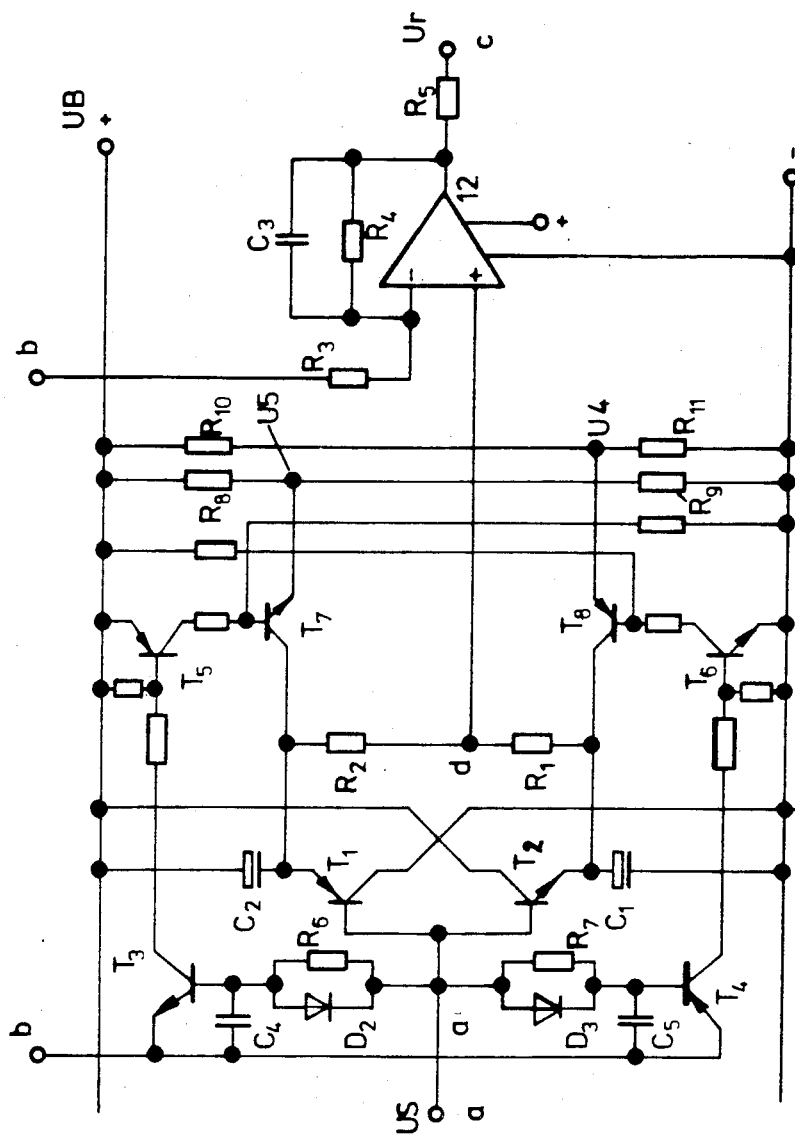
FIG. 5 is a practical embodiment of the AFC circuit of FIG. 1 with connectable substitute voltage sources.

R1: 220 kOhm
R2: 220 kOhm
R3: 100 kOhm
R4: 1.0 MOhm
R5: 47 kOhm
R8: 22 kOhm
R9: 11 kOhm
D1: Type 1N 4148
T1: Type BC 558B
T2: BC 548B
Amplifier 12: (OP) IC Type TL 071
C1: 1 μF
C2: 1 μF
C3: 0.47 μF FIG. 5 shows a modification of FIG. 2 which is of advantage whenever for any desired period of time one of the voltage values U1, U2 of the signal voltage US is not being received. For such a case, e.g. if U2 corresponding to 2100 Hz is missing, capacitor C2 is connected to voltage source U5 via transistor T7, which is controlled by means of T3 and T5, or if U1 corresponding to 1300 Hz is missing, capacitor C1 is connected to voltage source U4 via transistor T8, which is controlled by T4 and T6. This connection depends on the respectively present voltage US. If this voltage changes in rapid succession between U1 and U2, capacitors C4 and C5 are charged with the one halfwave and, as soon as the other halfwave is present, are discharged again via diode D2 and D3, respectively. This causes transistors T2 and T4 to remain blocked and the circuit operates as described in connection with FIG. 2. If there is no change in the control voltage, i.e. if one of the two frequencies is missing, e.g. f=2100 Hz, during the transmission pauses, capacitor C4 is charged positively in this case so that voltage U5 is applied to C2 via the E-C path of T7. This voltage U5 is realized by voltage divider R8/R9, which is designed in such a manner that, e.g. ¼ UB is applied to C2.

In the other case, if U1=1300 Hz is missing, C5 is charged. This causes voltage U4 to be applied to C1, which voltage is determined by voltage divider R10/R11, e.g. to ¾ UB.

The time constant for the connection of the substitute voltage source to the capacitors is dimensioned in such a manner that if one of the frequencies f1, or f2 is missing, the voltage across capacitors C1 and C2, respectively may drop by a maximum of 10% before T2 and T8, respectively, are closed. This time constant is determined by the dimensions of resistors R6 and R7, respectively, and capacitors C4 and C5, respectively.

We claim:

1. A decoder for a frequency keyed signal (2), particularly an FSK videotext signal, comprising: a PLL circuit including a regulated oscillator and a phase comparison stage from which a signal voltage (Us) which changes between two values (U1, U2) is derived through a lowpass filter and is fed to an amplitude selective circuit whose output voltage is the output signal of said decoder and has two different values depending on whether said signal voltage (Us) is below or above a reference voltage (Uref); and an automatic frequency control circuit means for deriving a regulating voltage (Ur) from a difference (ΔU−ΔU2) between the first value and the second value (U1 and U2, respectively) of said signal voltage (Us) relative to said reference voltage (Uref) and for feeding said regulating voltage (Ur) to said oscillator so as to continuously regulate its natural frequency, said automatic frequency control circuit means including two capacitors (C1, C2) which store the respective two voltage values (U1, U2) of said signal voltage (Us) and which are connected together by means of a resistance network (R1, R2), and a comparison stage to which the voltage at a tap (d) of said network (R1, R2) and said reference voltage (Uref) are fed and which furnishes said regulating voltage (Ur).

2. Decoder according to claim 1 wherein said control circuit means further includes an input terminal (a) for said signal voltage (Us) which is connected with a base of each of two complementary transistors (T1, T2), each in collector-base connection, with the two capacitors (C1, C2) lying in the emitter circuits of said transistors.

3. Decoder according to claim 1, wherein a diode (D1) serving to limit the stored voltage is connected to one capacitor (C2).

4. Decoder according to claim 1 wherein said control circuit means further includes a further lowpass filter (R4, C3) having a limit frequency of approximately 0.35 Hz for said regulating voltage (Ur).

5. Decoder according to claim 4 wherein said comparison stage is an operational amplifier and wherein said further lowpass filter is an active filter formed by an RC feedback network for said operational amplifier.

6. Decoder according to claim 1, wherein said network is comprised of two identically sized resistors (R1, R2).

7. Decoder according to claim 6 wherein said control circuit means further includes an input terminal for said signal voltage (Us), two complementary transistors, each connected in collector-base configuration and each having its base connected to said input terminal and a respective one of said two capacitors connected in its emitter circuit; and wherein said two resistors of said resistance network each have one end connected to the emitter of a respective one of said two complementary transistors, and have their respective other ends connected together to form said tap.

8. Decoder according to claim 7 wherein said comparison stage comprises an operational amplifier having its inverting input connected to receive said reference voltage (Uref) and its inverting input connected to said tap.

9. Decoder according to claim 7, wherein said control circuit means further includes means, connected to said input terminal and responsive to said signal voltage (Us), for connecting a substitute voltage source to a respective one of said capacitors if the associated one of said two voltage values (U1, U2) is absent.

10. Decoder according to claim 1, wherein, if one of said two voltage values (U1, U2) of said signal voltage (US) is absent at the capacitors (C1, C2), means are provided with which a substitute voltage source (U4, U5) is connected.

11. Decoder according to claim 10, wherein said substitute voltage source (U4, U5) corresponds to a voltage which tunes the oscillator (5) as if a voltage value (U1, U2) were present.

12. Decoder according to claim 10, wherein, if one of the two voltage values (U1, U2) of the signal voltage (US) is absent, the substitute voltage source (U4, U5) is connected with such a delay that the voltage across the capacitors (C1, C2) will not drop by more than 10%.

13. In a decoder for a frequency keyed signal (2), particularly an FSK videotext signal, comprising a PLL circuit including a regulated oscillator and a phase comparison stage from which a signal voltage (Us), which changes between first and second voltage values (U1, U2), is derived from said frequency keyed signal, a regulating voltage generating means for evaluating said signal voltage (Us) in relation to a reference voltage (Uref) and for generating a regulating voltage (Ur) for fine tuning said oscillator (5), and an amplitude selective circuit means (7) for evaluating said signal voltage (Us) in relation to said reference voltage (Uref) and for generating an output signal for said decoder (10); the improvement wherein: said regulating voltage generating means includes two capacitors (C1, C2) which store the respective said first and second voltage values (U1, U2) of said signal voltage (Us) and which are connected together via a resistance network (R1, R2), and, voltage comparison means (12) having inputs connected to a tap connected to (d) of said network (R1, R2) and to a source of said reference voltage (Uref) furnishing said regulating voltage (Ur) at its output.

* * * * *